(12) United States Patent
Hu et al.

(10) Patent No.: US 12,474,513 B2
(45) Date of Patent: Nov. 18, 2025

(54) BLUE LIGHT BLOCKING FILM LAYER AND BLUE LIGHT BLOCKING SYSTEM

(71) Applicant: EUTEC NEW MATERIALS TECHNOLOGY (SUZHOU) CO., LTD., Jiangsu (CN)

(72) Inventors: Hanmin Hu, Jiangsu (CN); Yufeng Zeng, Jiangsu (CN); Haitao Wei, Jiangsu (CN); Fangyuan Jiang, Jiangsu (CN)

(73) Assignee: EUTEC NEW MATERIALS TECHNOLOGY (SUZHOU) CO., LTD. (CN)

( * ) Notice: Subject to any disclaimer, the term of this patent is extended or adjusted under 35 U.S.C. 154(b) by 221 days.

(21) Appl. No.: 18/188,979

(22) Filed: Mar. 23, 2023

(65) Prior Publication Data

US 2023/0314675 A1   Oct. 5, 2023

Related U.S. Application Data

(63) Continuation of application No. 16/637,271, filed as application No. PCT/CN2018/076390 on Feb. 12, 2018, now abandoned.

(30) Foreign Application Priority Data

Aug. 9, 2017   (CN) .......................... 201710674417.X (51) Int. Cl.
| | |
|---|---|
| *C07C 255/41* | (2006.01) |
| *C07C 229/44* | (2006.01) |
| *C07D 231/06* | (2006.01) |
| *C08F 220/18* | (2006.01) |
| *C08J 7/044* | (2020.01) |
| *C08J 7/054* | (2020.01) |
| *C08K 5/18* | (2006.01) |
| *C08K 5/315* | (2006.01) |
| *C08K 5/3445* | (2006.01) |
| *C09D 133/08* | (2006.01) |
| *G02B 5/22* | (2006.01) |

(52) U.S. Cl.
CPC ............ *G02B 5/223* (2013.01); *C07C 229/44* (2013.01); *C07C 255/41* (2013.01); *C07D 231/06* (2013.01); *C08F 220/1804* (2020.02); *C08J 7/044* (2020.01); *C08J 7/054* (2020.01); *C08K 5/18* (2013.01); *C08K 5/315* (2013.01); *C08K 5/3445* (2013.01); *C09D 133/08* (2013.01)

(58) Field of Classification Search
CPC ... C07C 229/44; C07C 255/41; C07C 255/42; C07D 231/06; C08K 5/315; C08K 5/3445
See application file for complete search history.

(56) References Cited

U.S. PATENT DOCUMENTS

| | | | |
|---|---|---|---|
| 2004/0126700 A1* | 7/2004 | Lee ................ | C09B 23/143 |
| 2010/0297559 A1* | 11/2010 | Hata ............... | H05K 3/04 |
| | | | 430/286.1 |

* cited by examiner

*Primary Examiner* — Karuna P Reddy

(57) ABSTRACT

A blue light blocking film layer and a blue light blocking system are disclosed. The system comprises at least one blue light blocking film layer, and a basal layer, and one or more optional release film layers, wherein, the blue light blocking film layer is essential and includes at least a compound selected from formula (I-1), (II-1) and (II-2),

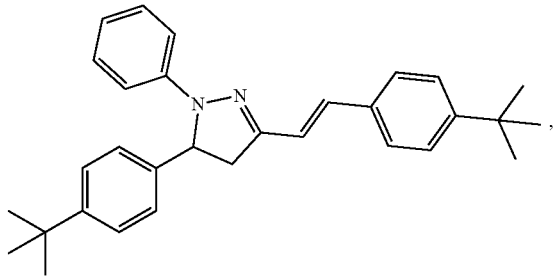

(I-1)

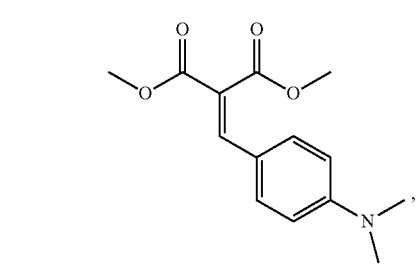

(II-1)

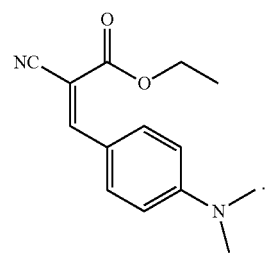

(II-2)

5 Claims, 2 Drawing Sheets

BLUE LIGHT BLOCKING FILM LAYER AND BLUE LIGHT BLOCKING SYSTEM

The present application is a continuation application of U.S. patent application Ser. No. 16/637,271, filed on Feb. 7, 2020, which claims priority of Chinese Patent Application No. 201710674417.X filed on Aug. 7, 2017, which is incorporated herein by reference in its entirety including the specification, drawings and abstract.

FIELD

The present invention relates to a blue light blocking film and a blue light blocking system.

BACKGROUND

Visible light includes red, orange, yellow, green, blue, indigo, and purple light. Red light has the longest wavelength and purple light has the shortest, and the shorter of the wavelength, the higher of the energy. Blue light can cause free radicals in the body (Investigative Ophthalmology & Visual Science (20140731), 55 (7), pp. 4119-4127). The blue light emitted from the 3C screen can easily pass through eye lens in the dim, which may cause ciliary muscle spasm, presbyopia, and macular lesions after a long time exposure. At present, blue light blocking agents are mainly dyes and inorganic phosphor compounds. Dark color is one of the disadvantages of these agents. For example, brown-colored glasses (CN106466925, CAPLUS AN 2017: 351046) are not suitable for indoor use.

A good blue light blocking agent must have at least two basic requirements. First, it can filter blue light. Second, it has a light color. In addition, an excellent blue light blocking agent is required to absorb blue light selectively, because the non-selective absorption of all bands of blue light can cause a visually unnatural feeling. In high-end applications, the absorption needs to gradually decrease as the wavelength increases, that is, blue light of longer wavelengths must have greater penetration. For example, for the optical lens, the transmitted blue light needs to have a 50% to 100% increasing penetration from 410 nm to 450 nm. In this way, it can cause a better visual feeling. Therefore, the conditions for being a blue light blocking agent are very severe. Actually there are few products on the market that can meet above requirements.

There has been disclosed a compound of formula (II-5) having a structure very similar to that of the compound of formula (II-1) of the present invention. The compound of formula (II-5) is dimethyl (p-methoxybenzylidene) malonate (trade name Eusorb-1988 or Clariant hostavin pr 25).

(II-1)

(II-5)

Compound of formula (II-5) has a maximum absorption peak at 314 nm, and is widely used as UVB (290-320 mu) ultraviolet absorbers (JP 4822129, CAPLUS AN 2008: 1039270) without blue light blocking effect (see also Table 1 of the present invention).

Compound of formula (II-1) of the present invention, has been disclosed in US2004126700 (Table 1, EC13) but the maximum absorption is indicated as 338-339 nm (much below 380 nm).

Therefore, both OCH3 or N(CH3)2 substituted dimethyl 2-benzylidenemalonate (II-1 or II-5) has not been used or disclosed or considered for blue light blocking in the prior art teaching.

(II-2)

(II-7)

There has been disclosed a compound of formula (II-7) having a structure very similar to that of the compound of formula (II-2) of the present invention.

Compound of formula (II-7) has a maximum absorption peak at 340 nm and is applied to ultraviolet absorbers. For example, claim 1 of JP09221583 (CAPLUS AN 1997: 571294) and U.S. Pat. No. 4,284,621 (CAPLUS AN 1980: 116437) both disclose applications in UVA absorption.

The use of the compound of formula (II-2) is known as a photoinitiator and was disclosed in J. App. Polym. Sci. Photosensitive resins containing p-dimethyl-aminobenzylidene derivatives and diphenyliodonium salt as photoinitiators, 1987, 34 (8), p. 2747-56 or JP03062163B (CAPLUS AN 1986: 79233). Its role is to cause free radicals to produce a series of photochemical chain reactions. This effect is completely different from the protecting effect for organism of the blue light blocking agents in present invention. Actually, the function for blue light blocking of the claimed compounds have never been applied, disclosed or predicted in the prior arts.

The pyrazoline compounds of formula (I) of the present invention are originally used as a photoinitiator in a photoresist for a printed circuit board, or as a reflective whitening agent in the opaque fiber-reinforced resin layer of the charge transport material printed circuit board, or as a charge transfer agent in the field of electrophotography, or as an antibacterial agent. For example, page 10 of CN102012634A (or column 4 of U.S. Pat. No. 8,198,008B2) discloses compound (I-1) as a photoinitiator, U.S. Pat. No. 8,361,697 discloses compound (I-1) as a high-sensitivity photoinitiator at h-line (405 nm), JP 63033481 (CAPLUS) AN 1981: 10007) discloses compounds (I-2) or (I-3) as photoinitiators.

For another example, (I-2) and (I-3) have been disclosed antibacterial effects in Chemical & Pharmaceutical Bulletin, 46 (8), 1998, p. 1254. Above disclosed functions have nothing to do with the filtering or protection function of the blue light blocking agent of the present invention, and have never been applied or disclosed for the blue light blocking function.

SUMMARY

For a good blue light blocking agent, function of filtering blue light and good color appearance are two basic requirements. For an excellent agent, it is required for further absorption capacity for the assigned blue light bands, so that the transmitted light can provide an excellent visual effect. Thus, the conditions for being an excellent blue light blocking agent are very severe.

To achieve this goal, the present invention specifically designs and screens for blue light blocking compounds. Surprisingly, the inventors have successfully devised compounds of formula (I) and (II), which can be used as excellent blue light blocking agents. The inventors also designs a blue light blocking system using (I) or (II) alone or in combination. The invention overcomes the disadvantages of traditional blue light blocking agents. For example, it overcomes the shortcomings of the dark colors caused by traditional dyes or inorganic phosphor agents. For another example, it overcomes the shortcomings of traditional blue light blocking agents that excessively absorb long-wavelength blue light, which causes poor visual experience.

The basic design of the blue light blocking agent system of the present invention is to use the blue light blocking compound of formula (I) alone or the formula (II) alone. Because at about 400±20 nm, there is a maximum absorption peak for formula (I) or formula (II). The blue light blocking compounds can also be used in combination, for example, a combination between three analogs of formula (I-1), formula (I-2), and formula (I-3), or, for another example, a combination between two analogs, formula (II-1) and formula (II-2). The advantage is that, on the one hand, the analogs in between have good compatibility, and on the other hand, by adjusting the ratio between the analogs, it can selectively absorb blue light in different bands, making the transmitted blue light better visual effect.

The maximum absorptions of (I-1), (I-2), and (I-3) in the blue region are each about 390 nm, 380 nm, and 420 nm, respectively (slightly different in different solvents). Mixing at a specific ratio can achieve different effects through filtering blue light. Compound (I-1), (I-2), and (I-3) have similar structures, therefore can be well mixed in solvents with almost any ratio. In this way, by controlling the ratio of (I-1), (I-2), and (I-3) compounds, blue light in different wavelength bands can be selectively absorbed, so that the transmitted blue light can provide good visual effect. In the same way, the blue light blocking agent system can also be a combination of compounds of formula (II), such as a combination of compounds of formula (II-1) and formula (II-2).

The maximum blue light absorption of compounds of formula (II-1) and (II-2) is about 380 nm, 420 nm (slightly different in different solvents). By controlling the ratio of (II-1) and (II-2), the blue light can be selectively absorbed, so that the transmitted blue light can provide a better visual effect.

The blue light blocking system can also be a combination of compounds of formula (I) and formula (II), for example, the combinations selected from compound of formula (I-1), formula (I-2), formula (I-3), formula (II-1), and formula (II-2).

Compounds of formula (I-1), formula (I-2), formula (I-3), formula (II-1), formula (II-2) have maximum absorption peaks at about 400 t 20 nm, and all of which can effectively removes the harmful blue light, ie., the blue light with shorter wavelengths.

From wavelength of 410 nm to 450 nm, the absorption of (I-1), (I-2), (I-3), (II-1), and (II-2) compound, decrease linearly (or close to linearly). These result in the transmitted blue light provide good visual effect for human. Although the structures of the compounds of formula (I) and (II) are not similar, many solvents can be used for both compounds of formula (I) and (II), for example, toluene, methyl ethyl ketone, isopropyl alcohol, ethyl acetate, acetonitrile, and the like. Therefore, the compounds of formula (I) and (II) can be mixed in solvent or solvent combination with various proportions to achieve the effect of blue light blocking.

The blue light blocking system can be used in combination with ultraviolet blocking compounds to achieve functions of preventing both ultraviolet and blue light at the same time. For example, dimethyl (p-methoxybenzylidene) malonate (that is, compound of formula II-5, UV absorption maximum absorption peak at 314 nm), 2.2'-(1,4-benzenedimethylene) tetraethyl dimalonate (i.e. compound of formula II-6. UV absorption maximum absorption peak at 320 nm), and cyano-p-methoxycinnamate (i.e. compound of formula II-7, UV absorption maximum absorption peak at 340 nm).

UVA (approximately 320-400 nm) ultraviolet light can penetrate glass. It is the main ultraviolet light in rooms. In contrast. UVB (about 290-320 nm) ultraviolet light is the main ultraviolet light of solar radiation that causes biological effects on skin outdoors.

In many applications, it is expected to absorb both UVA (about 320-400 nm) and blue light (about 380 nm-450 nm) at the same time. Other blue light blocking systems that absorb both UVAB (about 290-400 nm) and full-band blue light (about 380 nm-450 nm) are also expected.

Blue light with a wavelength of 410 nm-450 nm is a low-energy blue light. A blue light blocking system with decreasing absorption values from wavelength of 410 nm to 450 nm is expected, because the resulting penetrating light can provide a good visual effect. An UV-blue light blocking system with UVAB absorption (about 290-400 nm) and selective absorption of blue light (from 410 nm to 450 nm with decreasing absorption) is highly anticipated. For example, a specific combination of one or more compounds selected from formula (I-1), formula (I-2), formula (I-3), formula (II-1), formula (II-2), formula (II-5), formula (II-6), and formula (II-7).

Compounds of Present Invention (I)

(II)

Wherein, $R_1$ to $R_3$ are each independently selected from H, straight or branched $C_1$ to $C_6$ alkyl, $OR_3$, and $N(R_3)_2$, and $R_4$ to $R_6$ are each independently selected from H, and straight or branched $C_1$ to $C_6$ alkyl, $R_7$ to $R_8$ are each independently selected from $COOR_9$, $CONR_{10}R_{11}$, $COR_{12}$, and CN, and $R_9$ is selected from H, straight or branched $C_1$ to $C_{18}$ alkyl, and polyethylene glycol groups, and $R_{10}$ to $R_{12}$ are each independently selected from H, straight or branched $C_1$-$C_6$ alkyl, and phenyl.

A preferred embodiment, $R_1$ to $R_2$ are each independently selected from $C_1$ to $C_5$ alkyl, $OCH_3$, and $N(CH_3)_2$, $R_3$ to $R_4$ are H, and $R_5$ to $R_6$ are each independently linear or branched $C_1$ to $C_4$ alkyl, $R_7$ to $R_8$ are each independently selected from $COOR_9$, $CONR_{10}R_{11}$, $COR_{12}$, and CN, $R_9$ is H or a linear or branched $C_1$ to $C_{18}$ alkyl group or a polyethylene glycol group with a molecular weight of 40 to 500, $R_{10}$ to $R_{12}$ each is independently selected from H, straight-chain or branched $C_1$-$C_4$ alkyl, and phenyl.

More preferably, $R_1$ to $R_2$ are each independently selected from tert-butyl, methoxy, and dimethylamino groups, $R_3$ to $R_4$ are H, and $R_5$ to $R_6$ are each independently linear or branched $C_1$ to $C_4$ alkyl groups, $R_7$ to $R_8$ are each independently selected from $COOR_9$ and CN, and $R_9$ is a linear or branched $C_1$ to $C_4$ alkyl group or a polyethylene glycol group having a molecular weight of 40 to 350.

Particularly preferred embodiments include compounds of formula (I-1), formula (I-2), formula (I-3), formula (II-1) and formula (II-2).

(I-1)

(I-2)

(I-3)

(II-1)

(II-2)

A particularly preferred embodiment further includes a combination of one or more compounds of (I-1), (I-2), (I-3), (II-1), and (II-2). Another particularly preferred embodiment includes one or more compounds in combination selected from, for example, compounds of formula (I-1), formula (I-2), formula (I-3), formula (II-1), formula (II-2), formula (II-5), formula (II-6) and formula (II-7). Among them, formula (II-5), formula (II-6), and formula (II-7) are UV blocking compounds.

(II-6)

The UV blocking compounds can be dimethyl (p-methoxybenzylidene) malonate (compound of formula II-5), 2,2'-(1,4-benzenedimethylene) dimalonate Ethyl ester (compound of formula II-6), cyano-p-methoxycinnamate (compound of formula II-7), (2-benzotriazol-2-yl)-4,6-bis (1-methyl 1-phenylethyl) phenol, 2,2'-methylenebis (4-tert-octyl-6-benzotriazolephenol), or other UV blocking compounds.

The substituents of polyethylene glycol and fatty ester of the compound of formula (II) of the present invention have excellent low migration and high compatibility in application. In addition, the phenylacrylic compound of formula (II) according to the present invention can react with various resins, monomers or prepolymers to achieve the advantages of low mobility and high compatibility.

The blue light composition of the present invention can be optionally added a free radical scavenger or an antioxidant or a polymerization inhibitor, so that an unexpected light reaction is prevented while in storing. In addition, adjusting the pH of the composition can also prevent unexpected photoreactions. In the polymerization reaction of the blue light blocking composition, the selection of an appropriate wavelength initiator can also avoid the occurrence of unexpected light reactions.

As mentioned above, the prior arts disclose the photo-initiating effect of compounds of formula (I) or formula (II) on photoresists of printed circuit boards. Their function is to cause free radicals to produce a series of photochemical reactions. This function is a destructive effect, and is completely different from the protection function of the blue light blocking agents of the present invention. In addition, the application of the blue light blocking system of the present invention is to filter out bad blue light. On the one hand, the transmitted light does not have short-wavelength blue light that is harmful to the human body. On the other hand, visible light other than short-wavelength blue light can still pass through. This is completely different from the function of reflecting to block light of the fiber-reinforced resin of the opaque layer in the printed circuit board. Furthermore, the charge transfer functions and the blue light blocking system of the present invention are completely different.

Synthesis Route of Compounds of Formula (I-1)
(Example 1)

(I-1)

Synthesis Route of Compounds of Formula (II-1)
(Example 4)

(II-1)

The basic structure of the blue light blocking system of the present invention includes one or more blue light blocking film layers. The blue light blocking film layer can apply on article directly or put on a basal layer. The blue light blocking system can further have a release layer or release layers. Basically, the blue light blocking composition can apply on a basal layer or a release layer and then dried. Alternatively, a transfer coating process is to coat the composition on the release film and then transfer it to the basal layer. When the upper and lower layers of the blue light blocking film are laminated with a release film, this is called OCA optical clear adhesive (Optically Clear Adhesive).

Coating methods are conventional techniques, including traditional brush coating, spray coating, curtain coating, roll coating, slit coating, air knife coating, blade coating, and metering rod coating. Drying methods include natural drying, microwave drying, ultraviolet drying, infrared drying, and hot air drying.

The basal layer includes one or more of material, such as polyester, glass, polyethylene, polypropylene, polycarbonate, polyamide, polyacrylate, polymethacrylate, polyvinyl acetate, and polyvinyl chloride. The release film material includes silicone and non-silicone. Non-silicone material includes, for example, one or more mixtures of polyethylene, polypropylene, polyurea, polyacrylic, polyester, and fluorocarbons. OCA optical glue can be applied to different fields according to different thicknesses, such as transparent device binding, display assembly, lens assembly, panel, glasses or polycarbonate plastic materials.

The blue light blocking film may also include other film layers, such as a UV absorbing film layer, an anti-fog film layer, and an antistatic film layer. Blue light blocking film can be used in the optical or electronic industry, such as optical lenses, goggles, lenses, displays, panels, light protection.

The thermal initiation blue light blocking composition usually includes blue light blocking agent, a thermal initiator, a monomer, a solvent, and an auxiliary agent. Thermal initiators are classified according to the initiation temperature. High temperature (above 100° C.) initiators can be selected from alkyl peroxides, alkyl hydrogen peroxide compounds, and peroxide ester compounds. Medium temperature (40-100° C.) initiators include azo compounds, diacyl peroxide, or persulfate, etc. Low temperature (0-40° C.) initiators, for example, are used in redox initiation system. Thermal initiators can be divided into azo compounds and peroxides according to their molecular structure. The common used azo compounds include azobisisobutyronitrile (ABIN), azobisisoheptonitrile (ABVN), and azo compounds with carboxyl or sulfonic acid groups. The common used peroxides include benzoyl peroxide (BPO), di (2,4-dichlorobenzoyl) peroxide, diacetyl peroxide, dioctanoyl peroxide, dilauroyl peroxide, and diisopropyl peroxide. Benzene peroxide (DCP), di-tert-butyl peroxide (DTBP), tert-butyl peroxide benzoate (BPB), cumene hydrogen peroxide (CHP), tert-butyl hydrogen peroxide (TBH), Diisopropyl peroxide (IPP), diisobutyl peroxide (IBP), dicarbonate, methyl ethyl ketone peroxide, cyclohexanone peroxide, persulfate and hydrogen peroxide.

Monomer is small molecule containing double bonds or other reactive functional groups. Double bond monomers include acrylic, acrylate, methacrylic, methacrylate, hydroxyacrylate, methacrylate, diacetone acrylamide, vinyl, styrene, ethylene, vinyl fluoride, vinyl chloride, acrylonitrile, and vinyl acetate, silicone acrylate, epoxy acrylate, and polyurethane acrylate. Acrylic or acrylate monomers include acrylate soft monomers, acrylate hard monomers, acrylic functional monomers, or crosslinking monomers. Preferred acrylate soft monomers are, for example, ethyl acrylate, butyl acrylate, 2-ethylhexyl acrylate, or iso-octyl acrylate. Preferred acrylic hard monomers are, for example, methyl acrylate and methyl methacrylate. Preferred acrylic functional monomers are, for example, acrylic acid and methacrylic acid. Preferred crosslinking monomers are, for example, hydroxyethyl acrylate, hydroxypropyl acrylate, hydroxyethyl methacrylate, hydroxypropyl methacrylate, and adipic acid dihydrazide (ADH).

Thermosetting resins used in blue light blocking films are, for example, polyurethane resins, epoxy resins, phenolic resins, polyurea resins, unsaturated polyester resins, or alkyd resins. The monomers can be isocyanate, epichlorohydrin, phenol, aldehyde, polyol, fatty acid, polyacid, acid anhydride, polythiol, polyamine, alcoholamine, orthiolamine. Solvents include acetonitrile, acetone, methyl ethyl ketone, cyclohexanone, benzene, toluene, xylene, ethyl acetate, butyl acetate, methyl isobutyl ketone, methanol, ethanol, isopropanol, butanol, ethylene glycol, Propylene glycol, butanediol, vinyl chloride, dichloromethane, chloroform, carbon disulfide, tetrahydrofuran, dimethylformamide (DMF), and polyethylene glycol methyl ether (EGMME).

Polyurethane is produced by the reaction of polyester polyol or polyether polyol with isocyanate. Specifically, for example, a polyol and an isocyanate, a chain extender, and a catalyst (such as dimethylaminocyclohexane) are mixed, and then injected into a mold for curing. Or, isocyanate and polyol react first to form a prepolymer, and then add a chain extender. The epoxy resin monomer is formed by the reaction of epichlorohydrin and bisphenol A. Specific embodiments include reacting bisphenol A with epichlorohydrin, and then adding a hardener, such as dicyandiamide (Dicy) or adipic acid dihydrazide (ADH), and an accelerator, 2-methylimidazole. The monomers of the alkyd resin include polyols and fatty acids. Specifically, for example, glycerin, isophthalic anhydride, and fatty acids are put into a reaction tank, and heated to 200-250° C. until the desired viscosity and acid value.

The unsaturated polyester resin is a linear polymer compound having an ester bond and an unsaturated double bond. Monomers include unsaturated dibasic acids and unsaturated diols, or saturated dibasic acids and unsaturated diols. In a specific embodiment, for example, propylene glycol, butadiene anhydride, and phthalic anhydride are subjected to a condensation polymerization reaction in a reaction tank. The resulting unsaturated polyester is added with a styrene monomer to become a viscous resin, and cyclohexanone peroxide is added while in use.

Auxiliaries include one or more agents selected from stabilizers, coupling agents, leveling agents, defoamers, dispersants, solvents, chain transfer agents, catalysts, tougheners, tackifiers, plasticizers, thickeners, diluents, flame retardants, polymerization inhibitors, preservatives, hardeners, and acid-base adjusting agents.

The common used chain transfer agents are, such as aliphatic thiols and dodecyl thiols. The common used stabilizers are UV absorbers, hindered amines, antioxidants, anti-hydrolysis agents, peroxide scavengers, free radical scavengers. Thermally initiated blue light blocking composition may include blue light blocking agent mass content from 0.01% to 20%, initiator mass content from 0.01 to 10%, monomer or prepolymer or polymer content from 50 to 99.98%, and auxiliary mass content from 0 to 80%. Among them, the mass content of the blue light blocking agent is preferably 0.05% to 10%, and more preferably 0.1% to 5%. For example, an acrylic soft monomer, an acrylic hard monomer, an acrylic functional monomer, and an acrylic crosslinking monomer are mixed to form a monomer mixture. The monomer mixture, the initiator and the solvent are then added to the reaction tank, and the reaction is heated. After the reaction is completed, the temperature is lowered to the room temperature. The product is discharged, and is evenly coated on a basal layer.

The photo-initiated blue light blocking composition usually includes a blue light blocking agent, a polymerized monomer or/and a prepolymer, a photoinitiator, and an auxiliary agent. Photoinitiators are mainly divided into free radical photoinitiators and cationic photoinitiators, and the radical photoinitiator is further divided into a cleavage photoinitiator and a hydrogen abstraction photoinitiator. Cleavage type free radical photoinitiators are mainly aryl alkyl ketones, including one or more compounds selected from benzoin derivatives, dialkoxyacetophenones, α-hydroxyalkyl phenones, α-aminoalkyl phenones, acylphosphines, esterified oxime ketone compounds, aryl peroxyester compounds, halomethyl aryl ketones, organic sulfur compounds, and benzoyl esters. Hydrogen-abstracting free-radical type photoinitiators, include one or more compounds selected from active amine, benzophenone, thia anthrone anthraquinones, coumarone, camphorquinones, and, the derivatives thereof. Cationic photoinitiators, include one or more compounds selected from diazonium salt, diaryl iodonium salt, triarylsulfonium salt, alkylsulfonium salt, iron aromatic hydrocarbon salt, sulfonyloxyketone, and triarylsilyl ether.

Prepolymers are oligomers that contain functional groups and can be further reacted, for example, methacrylate oligomers, acrylate oligomers, epoxy acrylate oligomers, polyurethane acrylate oligomers, silicones Acrylate oligomer, amino acrylate oligomer, carboxy acrylate oligomer, phosphate acrylate oligomer, hydroxy polyacrylate oligomer, polyester acrylate oligomer, and polyether acrylate. Prepolymer can be used alone or in a mix.

The polymerization monomer can be one or more kinds of small molecules in an addition or condensation polymerization reaction. Among them, double bond monomers include acrylic, acrylic, methacrylic, methacrylic, hydroxyacrylic, methacrylic, diacetone acrylamide, ethylene, styrene, diene, vinyl fluoride, vinyl chloride, acrylonitrile, and vinyl acetate, silicone acrylate, epoxy acrylate, and urethane acrylate. Acrylic or acrylate monomers, include acrylate soft monomers, acrylate hard monomers, acrylic functional monomers, and crosslinking monomers. Preferred acrylate soft monomers are, for example, ethyl acrylate, butyl acrylate, 2-ethylhexyl acrylate, or isooctyl acrylate. Preferred acrylic hard monomers are, for example, methyl acrylate or methyl methacrylate. Preferred acrylic functional monomers are, for example, acrylic acid or methacrylic acid. Preferred crosslinking monomers are, for example, hydroxyethyl acrylate, hydroxypropyl acrylate, hydroxyethyl methacrylate, hydroxypropyl methacrylate, or adipic acid dihydrazide. Wherein, the mass content of the blue light blocking agent is 0.01% to 20%, preferably 0.05% to 10%, and more preferably 0.10% to 5%. Auxiliaries may include stabilizers, coupling agents, leveling agents, defoamers, dispersants, solvents, chain transfer agents, catalysts, tougheners, tackifiers, plasticizers, thickeners, diluents, flame retardants.

Auxiliaries may include one or more agents selected from stabilizers, coupling agents, leveling agents, defoamers, dispersants, solvents, chain transfer agents, catalysts, tougheners, tackifiers, plasticizers, thickeners, diluents, flame retardants, polymerization inhibitors, preservatives, hardeners, and acid-base adjustment agents. Common auxiliaries include coupling agents, such as silane coupling agents. The common used auxiliaries may include one or more agents selected from of UV absorbers, hindered amine, antioxidants, and free radical scavengers.

The photo-initiated blue light blocking composition includes a mass content of the blue light agent from 0.01% to 20%, a mass content of the initiator from 0.01 to 10%, a monomer and/or prepolymer from 5 to 99.98%, and a mass content of the auxiliary agent of 0 to 95%. Preferably, the mass content of the blue light blocking agent is 0.05% to 10%, the mass content of the initiator is 0.05 to 5%, the monomer and/or prepolymer is 5 to 99.9%, and the mass content of the auxiliary agent is 0 to 50%. Specifically, a photo-initiated blue light blocking composition (for example, a combination of an acrylate monomer, an acrylate prepolymer, a blue light absorber, and an initiator Photocure 84) can be mixed and uniformly applied to a clean basal layer, and then UV-cured to form a blue light blocking film.

The non-reactive blue light blocking composition includes a blue light blocking agent, a polymer or polymers, a solvent or solvents, and/or an auxiliary agent or agents. It mainly uses the volatilization of the solvent or other dispersion medium in the coaling film to form a solid thin film. The polymer or polymers may be selected from, but not limited to polyacrylate, polymethacrylate, polyethylene, polypropylene, polyvinyl chloride, polystyrene, polyacrylonitrile, polyethylene terephthalate, polyethylene terephthalate succinate, polycarbonate, polyamide, ethylene-vinyl acetate copolymer, polyvinyl alcohol, acrylonitrile-styrene copolymer, thermoplastic polyurethane, polyimide, cellulose, polysulfide, polyphenylene oxide, polyformaldehyde, polysulfone, polyetheretherketone, polyamide-imide, polyetherimide, polyethersulfone, and polyetherimide. The non-initiating blue light composition may include a mass content of the blue light blocking agent from 0.01% to 20%, a polymer content from 5 to 99.99%, and a mass content of the auxiliary agent (from 0 to 95%).

Specifically, taking polystyrene as an example, the polystyrene plastic is dried, then pulverized into small pieces, put into a mixed solvent of xylene/ethyl acetate, and stirred until completely dissolved. Then add a plasticizer (such as dibutyl phthalate) and a blue light blocking agent to heat and stir to obtain the composition. After coating and drying to remove the solvent, a blue light blocking film is obtained. Plasticizers for polystyrene include phthalates, diterpenes, epoxy soybean oil, octyl epoxy soybean oleate, and alkylbenzene sulfonate.

The materials of blue light blocking optical lens or goggles of the present invention includes glass and polymer, such as polycarbonate (PC), polymethyl methacrylate (PMMA), nylon (PA), TPX (Polymethylpentene), polystyrene, diethylene glycol dialkyl carbonate resin (PEDC). The blue light blocking agent can be added to the resin in a specific proportion for co-molding. The mass content of the blue light blocking agent is 0.01% to 20%, preferably 0.05% to 10%, and more preferably 0.10% to 5%. The present invention can also use an impregnation process to immerse the lens in a solution containing n blue light blocking agent. The present invention can also use a thin film process to form a blue light blocking film on the lens surface. The invention can also adopt a transfer coating process, for example, coating on a release film first, and then transferring to an optical lens.

BRIEF DESCRIPTION OF THE DRAWINGS

The present invention is further described below with reference to the drawings and the embodiments.

DETAILED DESCRIPTION

Figure 1:
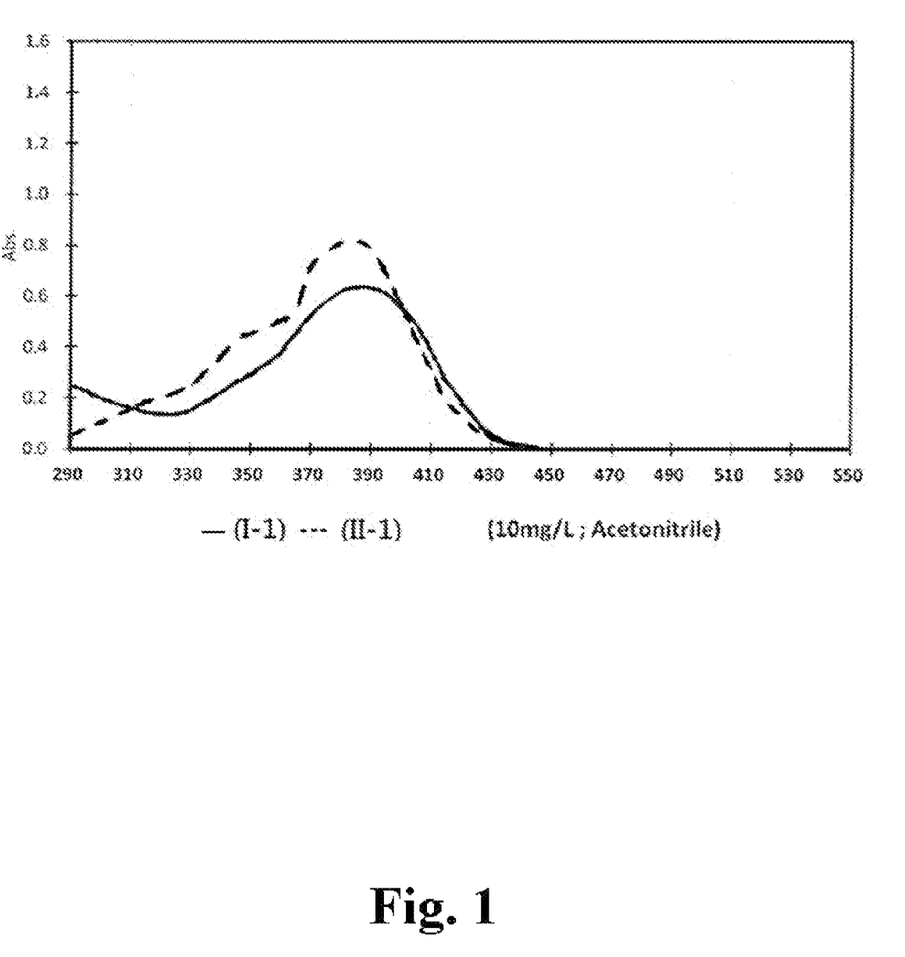
FIG. 1 shows UV-VIS absorption of the compounds (I-1) and (II-1) of the present invention
Figure 2:
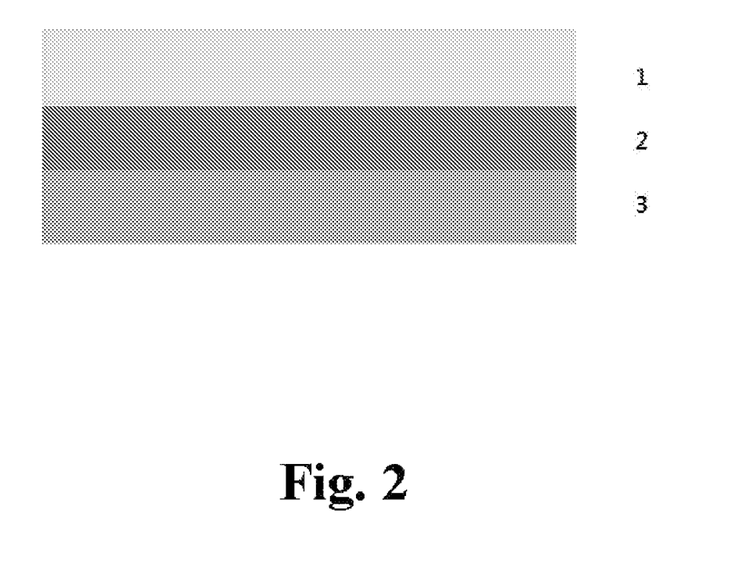
FIG. 2 is a schematic diagram of the side of the blue light blocking film: 1, the release layer, 2, the blue light blocking layer, 3, the basal layer
Figure 3:
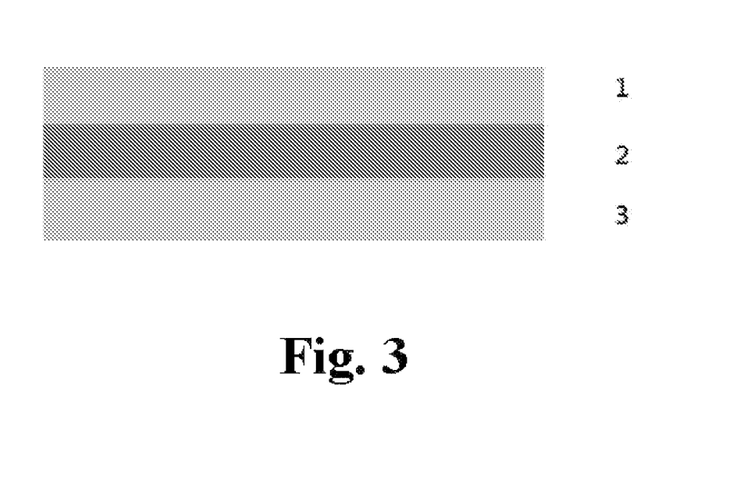
FIG. 3 is a schematic diagram of the side of the blue light blocking OCA optical adhesive (Optically Clear Adhesive): 1. a release layer, 2. a blue light blocking layer, and 3. a release layer.

The following is a description of specific embodiments of the present invention. These are not limited to these embodiments.

Example 1

Synthesis of a Compound of Formula (I-1), 1-phenyl-3-(4-butylstyryl)-5-(4-tert-butylphenyl) pyrazoline (I-1)

16.2 g of 4-tert-butylbenzaldehyde and 3.0 g of acetone were added to a freshly prepared sodium methoxide solution and stirred at room temperature for 3 hours. It was washed with water and dried to obtain the product bis (2-(4-tert-butyl) phenylvinyl) ketone. 7 g of bis (2-(4-tert-butyl) phenylvinyl) ketone and 2.2 g of phenylhydrazine were reacted in acetic acid for 4 hours. After cooling, the product was purified to give 1-phenyl-3_(4-butylstyryl)-5-(4-tert-butylphenyl) pyrazoline, mp 192-197° C. UV-VIS (ETOH.max.) 387 nm.

Example 2

Synthesis of (I-2) Compound, I-phenyl-3-(p-methoxystyryl)-5-(p-methoxyphenyl)pyrazol (I-2)

The same method as in Example 1, but replacing 4-tert-butylbenzaldehyde with p-methoxybenzaldehyde to obtain 1-phenyl-3-(p-methoxystyryl)-5-(p-methoxyphenyl) Pyrazoline (I-2) compound, melting point 159° C. UV-VIS (ETOH.max.) 381 nm.

Example 3

Synthesis of a Compound of Formula (I-3), phenyl-3-(p-dimethylaminostyryl)-5-(p-dimethylaminophenyl) pyrazoline (I-3)

The same method as in Example 1, but replacing 4-tert-butylbenzaldehyde with p-dimethylaminobenzaldehyde to obtain phenyl-3-(p-dimethylstyryl)-5-(p-dimethyl aminophenyl) pyrazoline, melting point 192° C., UV-VIS (ETOH.max.) 419 nm.

Example 4

Synthesis of Compound (II-1), dimethyl-2-(4-(dimethylamino) benzylidene) malonate (II-1)

Dissolve 15 g of 4-(dimethylamino) benzaldehyde and 14.5 g of dimethyl malonate in dichloromethane and stir. Add molecular sieve to remove water and install a calcium chloride tube to prevent water. 1 ml of piperidine and 0.6 ml of acetic acid were added, and the reaction was heated at reflux temperature for 2 hours. Fresh molecular sieves were added during the reaction. After the reaction is completed, the solvent is removed, and the dimethyl 2-(4-(dimethylamino) benzylidene) malonate (I-1) compound is obtained after acid washing and drying. The melting point is 87-88° C. UV-VIS (CH$_3$CN max.) 384 nm.

Example 5

Synthesis of a Compound (II-2), ethyl 2-ethyl-2-cyano-3-(4-(dimethylamino) phenyl) acrylate (II-2)

The same method as in Example 4 except that ethyl 2-cyanoacetate was used instead of dimethyl malonate to obtain ethyl 2-ethyl-2-cyano-3-(4-(dimethylamino) phenyl) acrylate ester (II-2) compound, melting point: 125-126° C. UV-VIS (CH$_3$CN max.) 420 nm.

Example 6

Synthesis of the Compound (I-3), stearyl alkyl 2-cyano-3-(4-(dimethylamino) phenyl) acrylate (II-3)

24 g of compound I-2 was dissolved in toluene and heated at reflux in a condensing trap at 110° C. To the toluene solution were added 27 g of stearyl alcohol and 1.5 g of p-toluenesulfonic acid. The reaction was monitored by HPLC. After the reaction was completed, it was dried by vacuum filtration to obtain compound (II-3). MS (M/Z: 468.4).

Example 7

Synthesis of a Compound of Formula (II-4), 2-ethyl-2-cyano-3-(4-(dimethylamino) phenyl) Acrylic Acid Polyether Ester (II-4)

The same method as in Example 6, Methoxypolyethylene glycol 350 was used instead of stearyl alcohol, and the product was purified by GPC to obtain 2-ethyl-2-cyano-3-(4-(dimethylamino) phenyl) acrylic acid polyether ester (II-4) Compounds.

Example 8

Blue Light Blocking Composition and Film 150 g of butyl acrylate, 95 g of methyl methacrylate, 15 g of acrylic acid, 5.8 g of blue light blocking agent, and 6 g of benzoyl peroxide were mixed in an ethyl acetate/toluene solvent, added to a reaction vessel, and heated to 75° C. After 2 hours, an additional of 6 g benzoyl peroxide (in solvent) was slowly added dropwise, and the reaction continued for about 6 hours. The viscosity was monitored. After the reaction was completed, the temperature was lowered to room temperature. After coating on a PET film and removing the solvent by drying, a blue light blocking film (100 μm) containing blue light blocking agent was obtained. Measure the transmittance of blue light band at 400 nm. The results are shown in Table 1.

TABLE 1

| Blue light transmittance of Example 8 | | |
| --- | --- | --- |
| | Light transmittance % blue light blocking agent | Blue light (400 nm) transmittance % |
| Ex. 8 | blank, II-5 | >80% |
| | Compound I-1, I-2, I-3, II-1, II-2 | <20% |

Example 9

Combination of Blue Light Blocking Agents

Table 2 shows the application of the compound of formula (I) alone, or a combination (I-1), (I-2), and (I-3), against blue light. Table 3 shows the application of the compound of formula (II) alone, or a combination of (II-1), (II-2), (II-5) against blue light. Table 4 shows the application of the combinations of (I-1), (II-1) and (II-5).

The "380-400 nm absorption" in Tables 2 to 4 indicates the absorption of shorter wavelength blue light (higher energy). Basically, the greater the absorption, the better the protection against shorter wavelengths of blue light will be. The "UVA1 & 380 nm-450 nm absorption" in Table 2 indicates that it absorbs both long-wavelength UVA1 (about 340-400 nm) and blue light of 380 nm-450 nm, basically, the greater the absorption, the better the protection effect against long-wavelength ultraviolet light (UVA1) and full-band blue light. The "UVAB & 380 nm-450 nm absorption" in Tables 3 and 4 indicates that it absorbs both UVAB (about 290-400 nm) ultraviolet light and blue light in the full-band of 380 nm-450 nm, the greater the absorption, the better the protection against ultraviolet (UVAB) and full-band blue light. In Tables 2 to 4, "410 nm-450 nm absorption decreases" indicates that the absorption from 410 nm to 450 nm decreases gradually and the transmitted blue light has better color visual effects. "−" means poor effect, "+" means good effect, "++" means very good effect, and "+++" means excellent effect.

TABLE 2

| Combinations of compounds of formula (I) | | | | | |
| --- | --- | --- | --- | --- | --- |
| | I-1 (%) | 1-2 (%) | I-3 (%) | UVA1 & 380-450 nm absorption | 380-400 nm absorption | 410-450 nm absorption decrease |
| 1 | 100 | 0 | 0 | ++ | +++ | +++ |
| 2 | 0 | 100 | 0 | ++ | +++ | ++ |
| 3 | 0 | 0 | 100 | ++ | +++ | ++ |
| 4 | 0 | 40-60 | 40-60 | +++ | +++ | ++ |
| 5 | 40-60 | 40-60 | 0 | ++ | +++ | +++ |
| 6 | 40-60 | 0 | 40-60 | +++ | +++ | ++ |
| 7 | 30-40 | 30-40 | 30-40 | +++ | +++ | ++ |

TABLE 3

| Combinations of compounds of formula (II) | | | | | |
| --- | --- | --- | --- | --- | --- |
| | II-1 (%) | II-2 (%) | II-5 %) | UVAB (290-400 nm) & 380-450 nm absorption | 380-400 nm absorption | 410-450 nm absorption decrease |
| 1 | 100 | 0 | 0 | + | +++ | +++ |
| 2 | 0 | 100 | 0 | + | +++ | ++ |
| 3 | 0 | 0 | 100 | − | − | − |
| 4 | 0 | 40-60 | 40-60 | ++ | +++ | ++ |
| 5 | 40-60 | 40-60 | 0 | + | +++ | ++ |
| 6 | 40-60 | 0 | 40-60 | ++ | +++ | +++ |
| 7 | 30-40 | 30-40 | 30-40 | +++ | +++ | ++ |

TABLE 4

| Combinations of formula (I) and formula (II) compounds | | | | | |
| --- | --- | --- | --- | --- | --- |
| | I-1 (%) | II-1 (%) | II-5 (%) | UVAB & 380-450 nm absorption | 380-400 nm absorption | 410-450 nm absorption decrease |
| 1 | 40-60 | 40-60 | 0 | + | +++ | +++ |
| 2 | 30-40 | 30-40 | 30-40 | +++ | +++ | +++ |

The above embodiments are not to limit the scope of protection of the present invention. The various types of the present invention, as well as technical solutions obtained by equivalent or equivalent substitutions, all fall within the protection scope of the present invention.

What is claimed is:

1. A blue light blocking system comprising at least one blue light blocking film layer, and a basal layer, and one or more optional release film layers, wherein, the blue light blocking film layer is essential and includes at least a compound selected from formula (I-1) and (II-2),

(I-1)

(II-2)

wherein, the blue light blocking film layer further comprises a compound of formula (II-1), (II-1)

2. A blue light blocking film layer comprising at least a compound selected from formula (I-1) and (II-2), (I-1)

(II-2)

wherein,
the blue light blocking film layer further comprises a compound of formula (II-1), (II-1)

3. The blue light blocking system according to claim 1, wherein,
the blue light blocking film layer has UVAB absorption from 290 nm to 400 nm and selective absorption of blue light from 410 nm to 450 nm with decreasing absorption.

4. The blue light blocking system according to claim 1, wherein, the blue light blocking system is an optical film, an optical lens or a goggle.

5. The blue light blocking film layer according to claim 2, wherein,
the blue light blocking film layer has UVAB absorption from 290 nm to 400 nm and selective absorption of blue light from 410 nm to 450 nm with decreasing absorption.

* * * * *